United States Patent [19]

Schwärzler

[11] 3,842,749

[45] Oct. 22, 1974

[54] TRANSPORT SYSTEM WITH MAGNETIC-SUSPENSION VEHICLE

[75] Inventor: Peter Schwärzler, Furstenfeldbruck, Germany

[73] Assignee: Krauss-Maffei Aktiengesellschaft, Munchen, Germany

[22] Filed: Jan. 16, 1973

[21] Appl. No.: 324,151

[30] Foreign Application Priority Data
Jan. 18, 1972 Germany.............................. 2202275

[52] U.S. Cl. ........................... 104/148 MS, 335/291
[51] Int. Cl............................................. B61b 13/08
[58] Field of Search...... 104/148 MS; 335/267, 291; 238/7, 25

[56] References Cited
UNITED STATES PATENTS

| | | | |
|---|---|---|---|
| 837,174 | 11/1906 | Ahlm .................................... | 335/291 |
| 2,366,919 | 1/1945 | Lillquist et al...................... | 335/291 |
| 2,750,118 | 6/1956 | Hastings et al. ...................... | 238/25 |
| 3,724,388 | 4/1973 | Karch................................ | 104/148 MS |

FOREIGN PATENTS OR APPLICATIONS
707,032  5/1941  Germany...................... 104/148 MS

*Primary Examiner*—M. Henson Wood, Jr.
*Assistant Examiner*—George H. Libman
*Attorney, Agent, or Firm*—Karl F. Ross; Herbert Dubno

[57] ABSTRACT

A transport system for a magnetically suspended or guided vehicle comprises a track which in part is structurally reinforced by an armature rail of magnetically attractable material serving as an armature for a guide or suspension electromagnet carried by the vehicle, thereby allowing the support member of the track to be of reduced weight and intrinsic strength. The electromagnet arrangement of the vehicle includes a row of electromagnets extending in the direction of travel and provided with cores of a magnetically permeable material, e.g., iron, which are so connected together and arranged as to contribute to the stiffness and structural strength of the body of the vehicle.

11 Claims, 10 Drawing Figures

TRANSPORT SYSTEM WITH MAGNETIC-SUSPENSION VEHICLE

CROSS-REFERENCE TO RELATED APPLICATIONS

The present application is related to the following commonly assigned copending applications:

Ser. No. 268,132 filed June 30, 1972, entitled "ELECTROMAGNETIC SUSPENSION AND GUIDE SYSTEM FOR MAGNETICALLY SUSPENDED VEHICLES;"

Ser. No. 280,074 filed Aug. 11, 1972, entitled "ELECTROMAGNETIC SUSPENSION AND GUIDE SYSTEM PARTICULARLY FOR VEHICLES;"

Ser. No. 324,135 filed Jan. 16, 1973, entitled "ELECTROMAGNETIC SUSPENSION AND GUIDE SYSTEM FOR VEHICLES ADAPTED TO SWITCH TRACKS;" and Ser. No. 362,012 filed May 21, 1973, entitled "ELECTROMAGNETIC SUSPENSION AND GUIDE SYSTEM FOR SUSPENDED VEHICLES ADAPTED TO SWITCH TRACKS."

FIELD OF THE INVENTION

The present invention relates to a transport system of the suspended vehicle type and, more particularly, to electromagnetically suspended vehicle systems in which a vehicle is displaced along a track in a substantially contactless manner.

BACKGROUND OF THE INVENTION

In recent years efforts have been directed to developing high-speed transport networks for the conveyance of passengers and freight in a more economical and rapid manner than has been possible heretofore. Considerable attention has been focused, in this connection, upon so-called magnetically suspended vehicles or "contactless" vehicles (magnetic-levitation vehicles) which are adapted to travel along track networks but are held by magnetic forces substantially out of direct load-transmitting engagement with the track.

In prior transport systems, e.g., of the rail type, the track, roadbed or right-of-way was provided with substantially continuous lengths of load-supporting rails engaged by wheels of the vehicle so that the weight of the vehicle and its load was transmitted by direct mechanical transfer to the tracks. A significant problem with such systems was the fact that the engagement between the rails and the vehicle was of the friction type so that the development of high speeds was in part limited by friction losses. In a substantially contactless transport system of the magnetic suspension type, the vehicle can be provided, as described in the aforementioned copending applications, with a row of electromagnets whose cores are juxtaposed with an armature rail carried by a track so that, upon excitation of the coils of the electromagnets, a magnetic field spans an airgap between the armature rail and the cores to support the vehicle out of load-transmitting mechanical engagement with the track.

Electromagnetic guide systems are known wherein an armature rail is provided along the track for cooperation with electromagnets carried by the vehicle, but these arrangements generally provide lateral or centering forces to maintain the vehicle in a central position against internally developed laterally dislocating forces (e.g., centrifugal force such as while the vehicle negotiates a curve) or extrinsic lateral forces such as those applied by wind to the vehicle. Most frequently, a magnetically guided vehicle provided with means of the last-described type, will also have magnetic suspension means providing the vertical force components which balance the vehicle weight. It is, however, possible to conceive of vehicle systems of the substantially contactless type which utilize other force fields, such as an air cushion, for support on the track while the lateral guidance is performed by magnetic means using a row of electromagnets and an armature rail.

When the term "contactless" or "substantially contactless" is used herein, it is intended to denote such systems as provide a gap between the vehicle and the track spanned by a force field and free from the rigid transfer of load from the vehicle to the track through an incompressible body, notwithstanding the fact that nonload-supporting engagement, e.g., of a wiper or shoe with an electric current-carrying rail, may be present.

In vehicles of the magnetically suspended or guided type, which may driven by linear induction motors having reaction rails extending along the track, the track is provided at two transversely spaced parts with the suspension or guide armature rails and may have a channel-shaped configuration or a central configuration. In the channel configuration, the electromagnet arrangements of the vehicle are received between the sides of the channel which can carry the armature rails, whereas the vehicle may be formed with aprons reaching around a central track structure when the latter is used. For the most part, the track structure is fully load-carrying prior to the mounting of the armature rails thereon and is designed, without the armature rails, to carry the full load transferred thereto by the vehicles in addition to the weight of the armature rails which has been considered merely another load to be borne by the track.

Similarly, a rigid frame or plate structure is customarily provided upon the vehicle to support the electromagnet arrangement and provide the rigidity required to prevent the vibration or distortion of the positions of the electromagnets which are subjected to large forces because of the magnetic interaction mentioned above. The supports on the vehicle, therefore, are constructed and dimensioned to carry the full vehicle load and the load of the electromagnets prior to the mounting of the latter.

OBJECTS OF THE INVENTION

It is the principal object of the present invention to provide an improved transport system of the contactless type whereby both the vehicle and track structures and greatly simplified.

Another object of the invention is to provide a transport system of the character described which utilizes less structural material than earlier systems for the same purpose and thus is of lower capital cost.

Still another object of the invention is to provide a transport system for the purposes described which, for a given rigidity, stiffness and support characteristic, can be of lighter weight and lower cost than earlier systems, thereby allowing the useful load (load-carrying capacity) of the system to be increased for a given vehicle weight and electromagnet capacity.

SUMMARY OF THE INVENTION

These objects are attained, in accordance with the present invention which is based on my discovery, that either the armature rail or the core members of a magnetically suspended or magnetically guided vehicle system can be constructed and arranged to lend considerable structural strength to the support members to which they are fixed, thereby reducing the dimensions and mass of the support members without reducing the mechanical strength of the unit. In other words, the armature rails and cores, according to the invention, become structural members respectively of the track and the vehicle.

The present invention thus resides in a transport system which comprises a track defining a transport path for a vehicle and including a substantially continuous support member or beam and an armature-rail element fixed to and extending along the support member. The vehicle magnetically supported or guided on the track for substantially contactless displacement therealong, includes a body member and at least one row of electromagnets extending in the direction of travel of the vehicle, on the body member. The electromagnets include respective cores juxtaposed with the armature-rail element to form magnetic circuits closing through the cores and the armature-rail element across airgaps (for suspension and/or guidance) spanned by magnetic fields. The cores of each row of electromagnetic arrangement form a core element fixed to and extending along its body member generally parallel to the armature-rail element, with at least one of these elements, and preferably both, being structural members reinforcing the support and body members to which the rail element or core element is affixed.

In other words, the present invention provides a system wherein the rows of electromagnet cores and/or the armature rails serve as stiffening elements for the vehicle and/or the track, respectively. The rows of magnetic cores and/or the armature rails thus contribute to the vehicle and/or the track at least part of the requisite stiffness.

According to an important feature of the present invention, the magnetic cores are transformed into a stiffening element for the vehicle body by interconnecting them directly and rigidly with connecting members of nonferromagnetic material so that the row of magnetic cores acts substantially as a continuous metal channel of high structural strength and rigidity, in spite of the fact that the cores function individually. Hence structural elements which have hitherto been required to provide the necessary stiffness in the longitudinal direction of the vehicle can be omitted or reduced in size, enabling a weight saving and increase in the load-carrying capacity of the vehicle.

According to another important feature of the invention, the or each armature rail is formed as an iron or steel profile with a high polar moment of inertia and high bending strength and modulus of elasticity with a configuration strongly resistant to bending in a vertical plane through the rail. The rail is, moreover, anchored to its support member or beam so as to be able to accept compressive and bending stresses applied thereto and can reinforce the beam against deflection under the vehicle load. The armature rail thus constitutes a beam reinforcement adapted to carry all or part of the downward force transferred by the magnetic field from the vehicle to the track. The use of one or more armature rails of this character increases the choice of materials for the support members of the track and allows lightweight metallic or nonmetallic materials to be used. The or each rail is so anchored to its support member that it may form a tension or compression chord of the beam formed by the rail in conjunction with its support members. Where the track is composed of concrete, the armature rail may constitute a reinforcing bar and can replace a substantial proportion of the reinforcing rods or bars which have hitherto been employed.

Preferably, the structural elements formed by the armature rail and the interconnected cores are of substantially U-profile, with the web of the U or its flanges lying in a vertical plane. The flanges of the U preferably form pole pieces of the armature rail and the magnet cores, respectively. Where the structural elements are composed of steel, they have a high modulus of elasticity, at least by comparison with concrete, and increase the characteristic vibration frequency of the track. This has been found to be of considerable importance in control of vibrations produced by the magnetic interaction of the vehicle and track.

DESCRIPTION OF THE DRAWING

The above and other objects, features and advantages of the present invention will become more readily apparent from the following description, reference being made to the accompanying drawing in which:

FIG. 1b is a cross-sectional view taken generally along the line Ib — Ib of FIG. 1a;

FIG. 3b is a view taken generally along the line IIIb — IIIb of FIG. 3a.

SPECIFIC DESCRIPTION

Figure 1A:
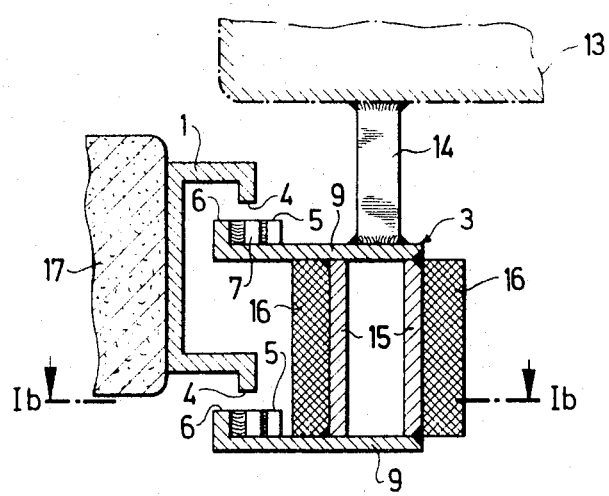
FIG. 1a is a vertical cross-section, in somewhat diagrammatic form, of a magnetic suspension arrangement according to the present invention (taken along line Ia — Ia of FIG. 1b)
Figure 1B:
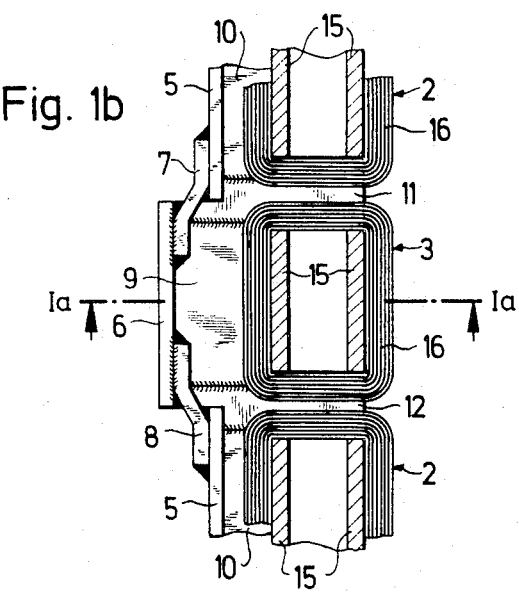

In FIGS. 1a and 1b, there is illustrated an armature rail 1 of a high-strength ferromagnetic material, preferably structural steel, which cooperates with a row of electromagnet cores 2 and 3 extending in the direction of travel of a vehicle 13 and staggered laterally from side to side as best seen in FIG. 1b to constitute a combined magnetic suspension and guide system for the vehicle. A similar row of magnetic cores juxtaposed with a respective rail may be provided on the opposite side of the vehicle so that the two rows are symmetrical with respect to a vertical median plane of the vehicle.

The armature rail 1 is generally of U-section and thus has a structural strength equivalent to that of a structural-steel channel, but augmented by the flanges formed by downwardly turned pole pieces 4 at the free ends of the horizontal shanks of the U. In this embodiment, the web of the U is anchored to a support member 17 and, as will be described in greater detail hereinafter, structurally reinforces the latter so as to constitute a continuous track beam therewith.

The magnet cores 2, 3 have mutually laterally offset upstanding pole pieces 5, 6, formed as shanks of U-profile core members whose web is here shown to be constituted by a pair of plates 15 welded to the shanks 9 at the ends of which the pole pieces 5 and 6 are turned upwardly. The pole pieces are rigidly interconnected in the longitudinal direction by nonferromagnetic plates 7 and 8 of generally Z-shape, the plates being composed of high strength nonmagnetic metal alloy and being welded to the pole pieces. The flanges 9 and 10 of magnetic material are also interconnected by welding with horizontally extending plates 11, 12 also of nonferromagnetic materials. As a result, the magnetic cores 2, 3 form a structural element of channel configuration which is attached by support posts 14 to the vehicle body and acts as a beam under tension contributing structural strength to the vehicle and stiffening the latter in the horizontal direction. The beams normally used in the vehicle chassis can thus be reduced in size or in part eliminated.

Various configurations of the rail assembly may be used, in accordance with the present invention.

Figure 2A:
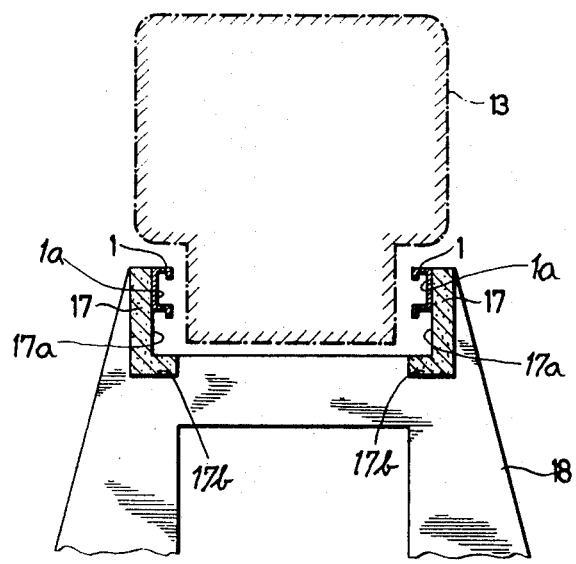
FIG. 2a is a vertical section through a channel-shaped track, according to the present invention, in somewhat diagrammatic form and with the vehicle shown in dot-dash outline.

In FIG. 2a, for example, the rails 1 are shown to be mounted along the inner faces 17a of horizontally extending beams 17 so that the webs 1a of each flange are under tension when the rails carry the load. The beam members 17 may be concrete and function as a compression or tension chord with the beam and the rail together taking up the distributed vehicle load. The beams 17 can be supported at intervals upon posts or pylons 18. To reinforce the structural action of the beam 17, the latter may be provided with an inwardly turned leg 17b underlying the armature rail 1.

Figure 2B:
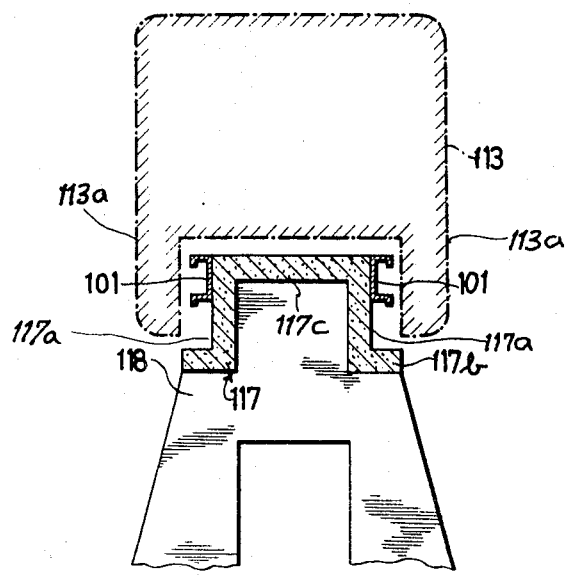
FIG. 2b is a vertical section through a central track embodying the present invention with the vehicle likewise being shown in diagrammatic form and in dot-dash outline.

In FIG. 2b there has been illustrated a modification in which the track is of the central configuration and the vehicle 113 has a pair of aprons 113a flanking the central beam 117 which is supported on the uprights 118 at spaced-apart locations. The compressive strength of the beam member 117, to which the rails 101 are affixed, is augmented by providing a horizontal web 117c between a pair of upright portions 117a of member 117 so that this member has a downwardly open channel configuration. In addition, outwardly turned legs 117b are provided to underlie the armature rails 101 facing outwardly on the central beam.

Figure 2C:
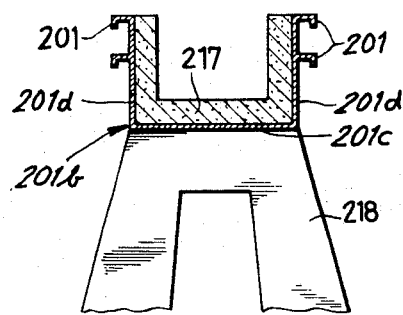
FIGS. 2c – 2f are views similar to FIGS. 2a – 2b illustrating other variants of track structures embodying the invention.

In the system of FIG. 2c, the armature rails 201 are formed along the upper edges of a channel 201b extending the full length of the track and composed of structural steel. The unitary (one-piece) channel 201b thus has a horizontal web 201c, received upon the pylons 218, and a pair of upright walls 201d formed with the flanges which constitute the armature rails 201. A U-section concrete body 217 forms an inner lining for the member 201b and constitutes a composite beam therewith, whereby at least part of the weight of the beam and load applied by the vehicle is taken up in compression and tension by both the structural steel and the concrete. Consequently less concrete and steel reinforcement therefor are required, even though the structural steel channel 201b is a load-carrying member.

Figure 2D:
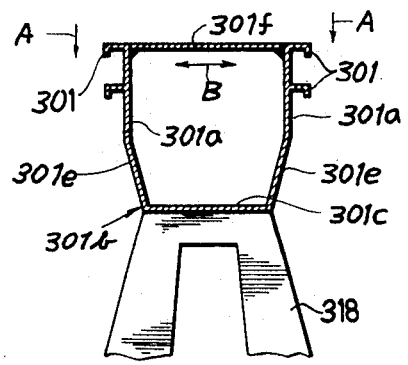

With the configuration shown in FIG. 2d, a concrete beam member is eliminated and the entire load-supporting structure is formed by the steel member constituting the armature rails. In this embodiment, the pylons 318 carry a generally tubular structure of prismatic cross-section, represented generally at 301c lying in a horizontal plane, a pair of upwardly divergent side walls 301e extending from and forming a channel with the web 301c, a pair of vertical side walls 301a formed with outwardly projecting flanges defining the armature rails 301, and a top plate 301f. Since the force exerted upon the armature rails is downwardly (arrows A), the plate 301f is under tension as represented by the arrow B and the walls 301a and 301e are under compression. The vehicle load likewise imparts a bending moment to the beam 301b such that, in the longitudinal direction, the web 301c is under tension and the plate 301f, together with the armature rail portions, may be under compression. In this embodiment the lower portion of the structure 301b forms the member which is reinforced by the armature rails.

Figure 2E:
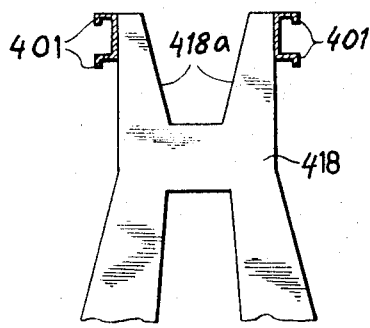

In the embodiment of FIG. 2e, the pylons 418 have upstanding arms 418a to which the armature rails 401 (of the same configuration as rails 1 in FIGS. 1a and 1b) are secured wherein, however, the cross-section of the rails is sufficient to provide the necessary structural strength between pylons to support both the weight of these rails and the magnetically transferred load of the vehicle.

Figure 2F:
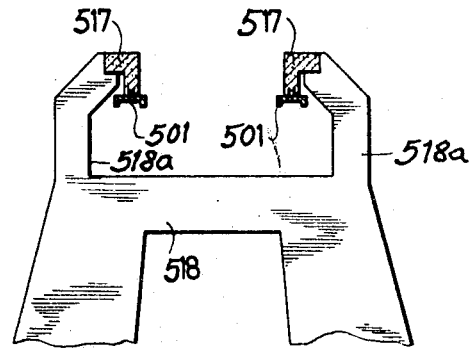

The embodiment of FIG. 2f makes use of pylons 518 whose arms 518a reach inwardly and carry continuous concrete beams 517 of L-profile, to the underside of which the downwardly open U-shaped rails 501 are anchored. In this arrangement, the armature rails constitute the tension flange of the beam while the concrete members 517 form compression flanges. In each of the embodiments illustrated, the armature rail, when associated with a concrete member, is preferably anchored to the latter by transverse bolts, or pins or other members, continuously or at a large number of spaced-apart locations.

Figure 3A:
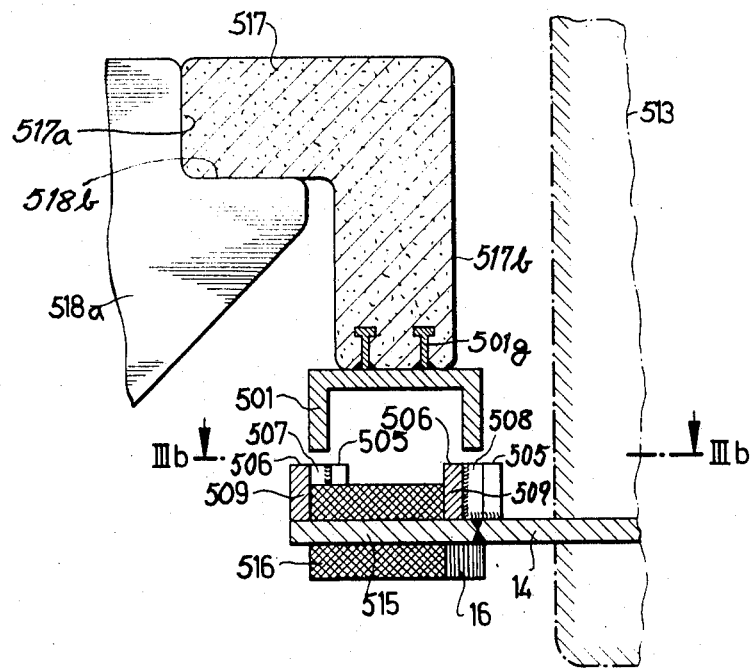
FIG. 3a is a vertical cross-section through another magnetic suspension and guide arrangement, shown partly in diagrammatic form (the section being taken along line IIIa — IIIa of FIG. 3b.
Figure 3B:
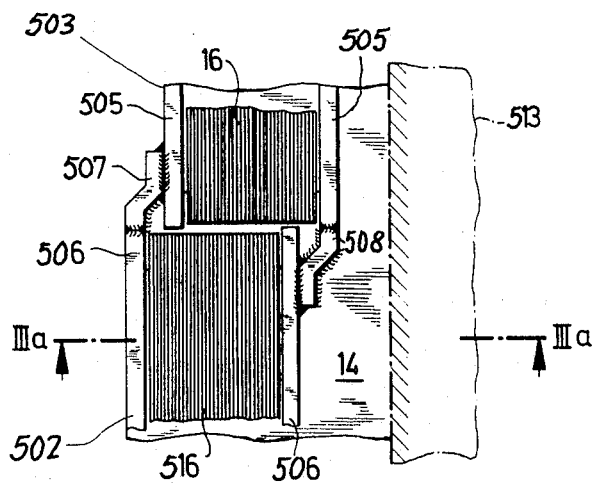

FIG. 3a shows an embodiment generally similar to that previously described in connection with FIG. 2f but wherein the anchorage is shown in greater detail and the electromagnetic system cooperating with the armature rail has also been illustrated in some detail. From this embodiment, it will be apparent that the horizontal arm 517a of the L-shaped concrete beam 517 rests upon a sill 518b of the arms 518, while the vertical flanges 517b receives a pair of upstanding fastening ribs 501g of T-profile, welded to the armature rail 501 along the entire length of the back of its web. As in the system of FIGS. the vehicle 513 carries a number of electromagnet cores 502, 503 joined together by a nonmetallic plate 514 by which the cores are anchored to the vehicle 513. The upstanding pole pieces 505 and 506, which are mutually staggered, are joined together by welded plates 507 and 508 so that an undulated U-profile channel member is formed by the core elements. Each of the core elements has a web 515 encircled by the electromagnet coil 516 and provided with upstanding flanges 509 which form the pole pieces.

I claim:

1. A transport system comprising a track formed by at least one substantially continuous load-supporting member including an armature rail and an electromagnetically suspended and guided vehicle travelling along said track, said vehicle including a body member and at least one row of electromagnets extending in the direction of vehicle travel on said body member, said armature rail being generally of U-section with a substantially vertically oriented web mounted on said member and substantially horizontally oriented shanks projecting codirectionally from said web, said shanks of said armature rail being turned downwardly at their free ends thereby forming substantially vertically oriented pole pieces, said electromagnets including respective magnet cores of generally U-section juxtaposed with said armature rail across airgaps spanned by magnetic fields, and electrically excitable coils for inducing magnetic fields in said cores, said magnet cores each being formed with a substantially vertically disposed web and substantially horizontally disposed shanks extending codirectionally from the web of the respective magnet core, said shanks of each core being turned upwardly at their free ends to form substantially vertically disposed pole pieces defining said airgaps with respective downwardly turned pole pieces of said armature rail.

2. The transport system defined in claim 1 wherein said cores of each row form a core element fixed to and extending along said body member generally parallel to said armature rail element and structurally stiffening said body member.

3. The transport system defined in claim 2, further comprising nonmagnetic plates mechanically and directly interconnecting said cores to form a rigid unit therewith.

4. The transport system defined in claim 2 wherein said rail is composed of a steel profile of high polar moment of inertia.

5. The transport system defined in claim 2 wherein said track further comprises support posts at spaced-apart locations, said rail spanning said posts and directly constituting a vehicle-support beam therebetween.

6. The transport defined in claim 2 wherein said track further comprises spaced-apart posts, said support member including a concrete beam portion spanning said posts, said rail being affixed to said concrete beam portion and forming another portion of a load-supporting beam therewith, at least one of said portions forming a compression flange of said beam.

7. The transport system defined in claim 6 wherein said concrete beam portion forms said compression flange, said rail being fixed to an underside of said concrete beam portion and forming a tension flange of the beam.

8. The transport system defined in claim 2 wherein said track is formed with posts at spaced-apart locations, a steel channel spanning said posts and having a horizontal web and a pair of upright sides, said rail being formed along one of said sides at a location remote from said web.

9. The transport system defined in claim 8, further comprising a concrete beam portion of channel configuration extending along and secured to said steel channel.

10. The transport system defined in claim 8, further comprising a plate interconnecting the walls of said channel along the top thereof.

11. A transport system comprising a track formed by at least one substantially continuous load-supporting member including an armature rail; and a vehicle supported on said track for substantially contactless displacement therealong, said vehicle including a body member and at least one row of electromagnets extending in the direction of travel of said vehicle on said body member, said electromagnets including respective cores juxtaposed with said armature rail to form magnetic circuits closing through said cores and said armature rail across air gaps spanned by magnetic fields, and electrically excitable coils for inducing magnetic fields in said cores, said cores being interconnected by nonmagnetic members to form a core element fixed to and extending along said body member generally parallel to said armature rail and structurally stiffen said body member, said armature rail comprising a generally U-shaped profile having a substantially vertically oriented web and a pair of substantially horizontally oriented codirectionally extending shanks with downwardly turned free ends lying substantially in a vertical plane, said magnet cores each being generally of U-section with a substantially vertically disposed web and a pair of substantially horizontal codirectional shanks with upwardly turned ends defining said airgaps with the downwardly turned ends of said armature rail.

* * * * *